United States Patent
Devrath

(10) Patent No.: US 11,728,757 B2
(45) Date of Patent: Aug. 15, 2023

(54) SYSTEM AND METHOD FOR CONTROLLING TEMPERATURE INSIDE ELECTRICAL AND ELECTRONICS SYSTEM

(71) Applicant: Carrier Corporation, Palm Beach Gardens, FL (US)

(72) Inventor: Mani Ram Devrath, Haryana (IN)

(73) Assignee: CARRIER CORPORATION, Palm Beach Gardens, FL (US)

(*) Notice: Subject to any disclaimer, the term of this patent is extended or adjusted under 35 U.S.C. 154(b) by 166 days.

(21) Appl. No.: 17/091,755

(22) Filed: Nov. 6, 2020

(65) Prior Publication Data

US 2021/0143768 A1 May 13, 2021

(30) Foreign Application Priority Data

Nov. 7, 2019 (IN) .............................. 201911045279

(51) Int. Cl.
| | |
|---|---|
| *H02P 21/22* | (2016.01) |
| *H02P 11/00* | (2006.01) |
| *H02P 29/68* | (2016.01) |
| *F25B 49/02* | (2006.01) |

(52) U.S. Cl.
CPC ............ *H02P 29/68* (2016.02); *F25B 49/022* (2013.01)

(58) Field of Classification Search
CPC ................................ H02P 29/68; H02P 29/64
See application file for complete search history.

(56) References Cited

U.S. PATENT DOCUMENTS

| | | | |
|---|---|---|---|
| 6,892,550 | B2 | 5/2005 | Takemoto et al. |
| 7,134,295 | B2 | 11/2006 | Maekawa |
| 7,174,733 | B2 | 2/2007 | Oomura et al. |
| 7,398,653 | B2 | 7/2008 | Oomura et al. |
| 8,328,525 | B2 | 12/2012 | Saito et al. |
| 8,459,053 | B2 | 6/2013 | Pham et al. |
| 8,593,099 | B2 | 11/2013 | Shibuya et al. |
| 8,950,528 | B2 | 2/2015 | Ozaki |
| 9,046,275 | B2 | 6/2015 | Kinoshita et al. |
| 9,321,353 | B2 | 4/2016 | Ozaki |
| 9,358,917 | B2 | 6/2016 | Ikemiya et al. |
| 9,746,227 | B2 | 8/2017 | Peng et al. |

(Continued)

FOREIGN PATENT DOCUMENTS

| | | |
|---|---|---|
| CN | 109831931 A | 5/2019 |
| CN | 110044032 A | 7/2019 |

(Continued)

OTHER PUBLICATIONS

Indian First Examination Report for Application No. 201911045279; dated Dec. 3, 2021; 5 Pages.

*Primary Examiner* — Kawing Chan
*Assistant Examiner* — Charles S Laughlin
(74) *Attorney, Agent, or Firm* — Cantor Colburn LLP

(57) ABSTRACT

A system and a method for controlling temperature inside electrical and electronics systems. The method includes sensing temperature of an inverter section by a temperature sensor, the inverter section including one or more electronic components. The method also includes determining, by a microcontroller, a temperature zone based on the sensed temperature and transmit a command to an inverter based on the temperature zone. The method further includes controlling speed of a compressor by an inverter based on the command.

15 Claims, 4 Drawing Sheets

(56) References Cited

U.S. PATENT DOCUMENTS

| | | | |
|---|---|---|---|
| 9,791,196 B2 | 10/2017 | Hagita et al. | |
| 9,825,615 B2 | 11/2017 | Schneider et al. | |
| 9,927,165 B2 | 3/2018 | Sutherland et al. | |
| 2003/0065472 A1* | 4/2003 | Eckel | H05B 47/105 |
| | | | 702/130 |
| 2007/0180841 A1 | 8/2007 | Bae et al. | |
| 2009/0092501 A1 | 4/2009 | Seibel | |
| 2011/0083450 A1 | 4/2011 | Turner et al. | |
| 2011/0110791 A1 | 5/2011 | Donnat et al. | |
| 2014/0000295 A1 | 1/2014 | Schuster | |
| 2016/0245288 A1* | 8/2016 | Yano | F04C 28/06 |
| 2017/0370626 A1* | 12/2017 | Ohyama | F25B 5/04 |
| 2018/0031263 A1 | 2/2018 | Gui | |

FOREIGN PATENT DOCUMENTS

| | | | |
|---|---|---|---|
| CN | 110112991 A | 8/2019 | |
| EP | 3489068 A1 | 5/2019 | |
| JP | 2009270732 A | 11/2009 | |
| JP | 2011202889 A | 10/2011 | |
| JP | 2013122328 A | 6/2013 | |
| KR | 20040097845 A | 11/2004 | |
| WO | 2018120142 A1 | 7/2018 | |

* cited by examiner

SYSTEM AND METHOD FOR CONTROLLING TEMPERATURE INSIDE ELECTRICAL AND ELECTRONICS SYSTEM

FOREIGN PRIORITY

This application claims priority to Indian Patent Application No. 201911045279, filed Nov. 7, 2019, and all the benefits accruing therefrom under 35 U.S.C. § 119, the contents of which in its entirety are herein incorporated by reference.

TECHNICAL FIELD OF INVENTION

The present invention generally relates to industrial systems. More particularly, the invention relates to a system and a method for controlling temperature inside electrical and electronics systems/s.

BACKGROUND OF THE INVENTION

Generally, electrical systems consists of a control box having an inverter section. The inverter section has various electronic/electrical components such as a circuit board, switches, an inverter circuit, a capacitor bank, motor drives, an electromagnetic interference (EMI) filter, reactors, terminal blocks, contactors, transformers, transistors, compressors and the like for controlling and working of the systems. The inverter section of the control box expels the heat generated by the electronic/electrical components of the inverter section.

When the electrical systems operates, the electronic components present therein generate heat. Also, the control box is usually enclosed to protect the electronic components of the inverter section from dust and water. Another reason for providing a closed control box is to prevent the spread of fire in the electronic components. This leads to a further increase in temperature within the control box as the heat is not able to escape externally. Due to insufficient cooling, the heat within the enclosed control box increases the temperature of the box leading to a rise in the temperature of the electronic components. Increase in the temperature of the electronic components adversely affects the life as well as the efficiency of the electronic components thereby affecting the performance of the associated systems. It may even lead to failure or malfunctioning of the systems and/or frequent power trips, thereby hampering routine work.

In view of the aforementioned problems, there is a need in the art for an effective and efficient means for providing adequate cooling inside the control box of any electrical system. In order to solve these problems, a system and a method are disclosed.

SUMMARY OF THE INVENTION

Various embodiments of the invention describe a system and a method for controlling temperature inside an inverter section of an electrical system by providing adequate cooling. The invention discloses a system comprising a temperature sensor adapted to sense temperature of an inverter section. The inverter section comprises one or more electronic components. The system also comprises a microcontroller adapted to determine a temperature zone based on the sensed temperature and transmit a command to an inverter based on the temperature zone. The system further comprises the inverter adapted to control speed of a compressor based on the command.

In another embodiment of the invention, the temperature sensor is mounted inside the inverter section of the system.

In another embodiment of the invention, the microcontroller is adapted to determine the temperature zone by comparing the sensed temperature with one or more pre-defined temperature ranges.

In yet another embodiment of the invention, the microcontroller is adapted to determine an automatic temperature zone when the sensed temperature in the inverter section falls below or equal to a first pre-defined temperature value. The microcontroller is adapted to transmit a command for automatically controlling a parameter by a first factor in the inverter section when the automatic temperature zone is determined.

In still another embodiment, the microcontroller is adapted to determine a safe temperature zone when the sensed temperature in the inverter section falls above a first pre-defined temperature value and falls below or equal to a second pre-defined temperature value. The microcontroller is adapted to transmit a command for controlling a parameter by a second factor when the safe temperature zone is determined.

In an embodiment of the invention, the microcontroller is adapted to determine a first down temperature zone when the sensed temperature in the inverter section falls above a second pre-defined temperature value and falls below or equal to a third pre-defined temperature value. The microcontroller is adapted to transmit a command for controlling a parameter by a third factor when the first down temperature zone is determined.

In another embodiment of the invention, the microcontroller is adapted to determine a second down temperature zone when the sensed temperature in the inverter section falls above a third pre-defined temperature value and falls below or equal to a fourth pre-defined temperature value. The microcontroller is adapted to transmit a command for controlling a parameter by a fourth factor when the second down temperature zone is determined.

In another different embodiment of the invention, the microcontroller is adapted to determine an alarm temperature zone when the sensed temperature in the inverter section is above a fifth pre-defined temperature value. The microcontroller is adapted to transmit a command for controlling a parameter by a fifth factor when the alarm temperature zone is determined.

In yet another embodiment of the invention, the microcontroller provides an alarm when the alarm temperature zone is determined.

In still another embodiment of the invention, the system is an outdoor unit of an air conditioner system or a refrigeration system.

In yet another embodiment of the invention, a method is disclosed for controlling temperature inside an inverter section of an electrical system by providing adequate cooling. The method comprises the step of sensing temperature of an inverter section by a temperature sensor. The inverter section comprises one or more electronic components. The method also comprises the step of determining, by a microcontroller, a temperature zone based on the sensed temperature and transmit a command to an inverter based on the temperature zone. The method further comprises the step of controlling speed of a compressor by an inverter based on the command.

In another embodiment of the invention, the temperature sensor is mounted inside the inverter section of the system.

In another embodiment of the invention, the microcontroller is adapted to determine the temperature zone by comparing the sensed temperature with one or more pre-defined temperature ranges.

In yet another embodiment of the invention, the microcontroller is adapted to determine an automatic temperature zone when the sensed temperature in the inverter section falls below or equal to a first pre-defined temperature value. The microcontroller is adapted to transmit a command for automatically controlling a parameter by a first factor in the inverter section when the automatic temperature zone is determined.

In still another embodiment, the microcontroller is adapted to determine a safe temperature zone when the sensed temperature in the inverter section falls above a first pre-defined temperature value and falls below or equal to a second pre-defined temperature value. The microcontroller is adapted to transmit a command for controlling a parameter by a second factor when the safe temperature zone is determined.

In an embodiment of the invention, the microcontroller is adapted to determine a first down temperature zone when the sensed temperature in the inverter section falls above a second pre-defined temperature value and falls below or equal to a third pre-defined temperature value. The microcontroller is adapted to transmit a command for controlling a parameter by a third factor when the first down temperature zone is determined.

In another embodiment of the invention, the microcontroller is adapted to determine a second down temperature zone when the sensed temperature in the inverter section falls above a third pre-defined temperature value and falls below or equal to a fourth pre-defined temperature value. The microcontroller is adapted to transmit a command for controlling a parameter by a fourth factor when the second down temperature zone is determined.

In another different embodiment of the invention, the microcontroller is adapted to determine an alarm temperature zone when the sensed temperature in the inverter section is above a fifth pre-defined temperature value. The microcontroller is adapted to transmit a command for controlling a parameter by a fifth factor when the alarm temperature zone is determined.

In yet another embodiment of the invention, the microcontroller provides an alarm when the alarm temperature zone is determined.

In still another embodiment of the invention, the system is an outdoor unit of an air conditioner system or a refrigeration system.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Described herein is a system and a method for controlling temperature inside an inverter section of a control box by providing adequate cooling. Further the inverter section of the control box may be a part of an appliance or system. In an exemplary embodiment, the system may be an outdoor unit of an air conditioner system or a refrigeration system. Moreover, a temperature sensor may be mounted in the inverter section for sensing temperature inside the inverter section and may transmit the sensed temperature to a microcontroller. The microcontroller may determine a temperature zone based on the sensed temperature and may further transmit a command to an inverter based on the temperature zone. Accordingly, the inverter may control speed of a compressor based on the command received from the microcontroller. This aids in preventing overheating of the inverter section of the system and consequent failure and/or malfunctioning of the system.

As used herein, the system may be an outdoor unit of an air conditioner system or a refrigeration system. Such a system may have a control box and an inverter section inside the control box. In another exemplary embodiment of the invention, the system may be a server system or any industrial system where the inverter section is used.

As used herein, the inverter section may be part of the system having one or more electronic or electrical components. Such electronic or electrical components may be electronic circuitry, transistors, thyristors, metal oxide silicon field effect transistors (MOSFETs), capacitors or any such components that may generate heat while operating.

Figure 1:
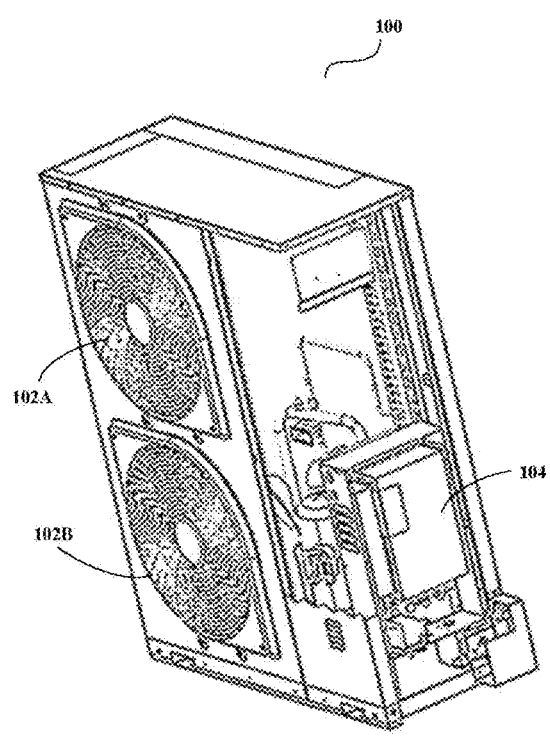
FIG. 1 depicts an exemplary system having a control box in accordance with an exemplary embodiment of the invention.

FIG. 1 depicts an exemplary system with a control box in accordance with an exemplary embodiment of the invention. As depicted in FIG. 1, the exemplary system 100 may be an outdoor unit of an air-conditioning unit or a refrigeration unit. Further, the exemplary system 100 may comprise, but is not limited to, one or more fans 102A-102B and a control box 104. The control box 104 may comprise an inverter section (not shown in FIG. 1) that may be adapted to provide and control operation/s as well as function/s to the system 100. Also, the one or more fans 102A-102B of the system 100 may pull out the air/heat from the system 100 to provide cooling to inside the system 100. The system 100 may also comprise a compressor that may control the temperature inside the inverter section of the system 100 by providing adequate cooling. The details of how the temperature is controlled and the compressor maintains adequate cooling inside the inverter section has been explained in details below.

Figure 2A:
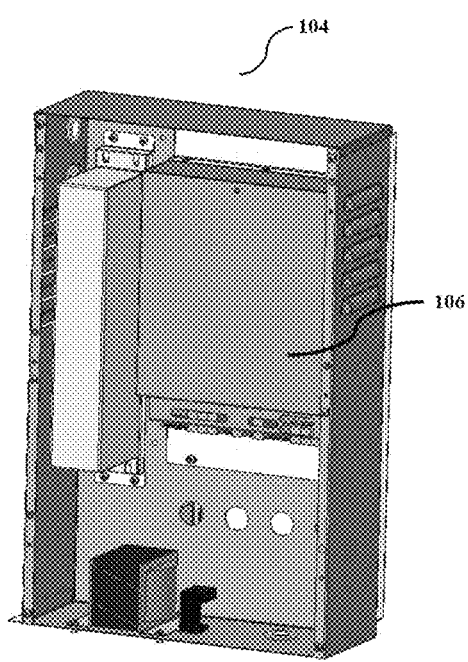
FIG. 2A depicts an external view of an exemplary inverter section of a control box in accordance with an exemplary embodiment of the invention and FIG. 2B depicts an internal view of an exemplary inverter section of a control box in accordance with an exemplary embodiment of the invention.
Figure 2B:
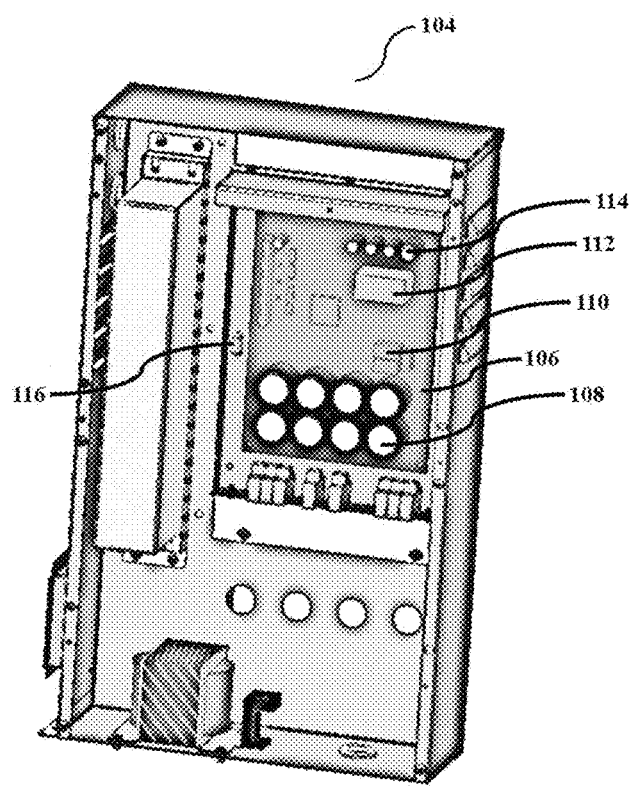

FIG. 2A depicts an external view of an exemplary inverter section of a control box in accordance with an exemplary embodiment of the invention. As depicted in FIG. 2A, the control box 104 comprises an inverter section 106. The inverter section 106 is enclosed with a cover to protect one or more electronic components of the inverter section 106 from dust or water. FIG. 2B depicts an internal view of an exemplary inverter section 106 of the control box 104 in accordance with an exemplary embodiment of the invention. As can be seen, the inverter section 106 comprises, but is not limited to, one or more electronic components such as capacitors 108, transistors 110, a microcontroller 112 and/or diodes or inductors 114 required for the functioning of the inverter section 106. Each of the one or more electronic components in the inverter section 106 emit heat while functioning.

The inverter section 106 further comprises a temperature sensor 116 adapted to sense temperature in the inverter section 106. The temperature sensor 116 may be communicably coupled with the microcontroller 112 and may transmit the sensed temperature of the inverter section 106 to the microcontroller 112. In an exemplary embodiment, the temperature sensor 116 may periodically transmit the sensed temperature to the microcontroller 112. For an instance, the temperature sensor 116 may sense temperature in every 10 minutes. In an exemplary alternative embodiment, temperature sensor 116 may transmit the sensed temperature to the microcontroller 112 based on an occurrence of an event. For an instance, the temperature sensor 116 may transmit the sensed temperature to the microcontroller 112 when the microcontroller 112 transmits a request to the temperature sensor 116 or any such event.

When the microcontroller 112 receives the sensed temperature from the temperature sensor 116, the microcontroller 112 may determine a temperature zone based on the sensed temperature in the inverter section 106. For this, the microcontroller 112 may compare the sensed temperature with one or more pre-defined temperature ranges. Moreover, the temperature zone may be an automatic temperature zone, a safe temperature zone, a first down temperature zone, a second down temperature zone and/or an alarm temperature zone. As used herein, the one or more pre-defined temperature ranges may be pre-configured by a manufacturer of the system 100, a manufacturer of the inverter section 106, a manufacturer of the one or more electronic components in the inverter section 106, a manufacturer of the control box 104 or a user of the system 100 or any such person.

In particular, the microcontroller 112 may be adapted to determine an automatic temperature zone when the sensed temperature in the inverter section 106 falls below or equal to a first pre-defined temperature value. The first pre-defined temperature value may correspond to 55° Celsius. Also, the microcontroller 112 may be adapted to determine a safe temperature zone when the sensed temperature in the inverter section 106 falls above a first pre-defined temperature value and falls below or equal to a second pre-defined temperature value. The first pre-defined temperature value may correspond to 55° Celsius and the second pre-defined temperature value may correspond to 56° Celsius. Likewise, the microcontroller 112 may be adapted to determine a first down temperature zone when the sensed temperature in the inverter section 106 falls above a second pre-defined temperature value and falls below or equal to a third pre-defined temperature value. The second pre-defined temperature value may correspond to 56° Celsius and the third pre-defined temperature value may correspond to 57° Celsius. Similarly, the microcontroller 112 may be adapted to determine a second down temperature zone when the sensed temperature in the inverter section 106 falls above a third pre-defined temperature value and falls below or equal to a fourth pre-defined temperature value. The third pre-defined temperature value may correspond to 57° Celsius and the fourth pre-defined temperature value may correspond to 60° Celsius. Further, the microcontroller 112 may be adapted to determine an alarm temperature zone when the sensed temperature in the inverter section 106 is above a fifth pre-defined temperature value. The fifth pre-defined temperature value may correspond to 60° Celsius. This embodiment of the present invention provides the technical advantage of preventing power trips occurring due to high temperature inside the inverter section 106 and also enhancing reliability of the system 100 by determining the temperature zone. The pre-defined temperature ranges may comprise a set of temperature values starting from a lower temperature value to a higher temperature value. It may be noted that the predefined temperature value described herein may be extreme ends of the pre-defined temperature ranges.

After the microcontroller 112 determines a temperature zone based on the sensed temperature of the inverter section 106, the microcontroller 112 may be adapted to transmit a command to an inverter of the system 100 for controlling speed of a compressor present in the system 100. Further, the microcontroller 112 may be adapted to transmit the command to the inverter based on the determined temperature zone. In specific, the microcontroller 112 may be adapted to transmit a command to the inverter for automatically controlling a parameter by a first factor in the inverter section 106 when the automatic temperature zone is determined. Also, the microcontroller 112 may be adapted to transmit a command to the inverter for controlling a parameter by a second factor in the inverter section 106 when the safe temperature zone is determined. Further, the microcontroller 112 may be adapted to transmit a command to the inverter for controlling a parameter by a third factor in the inverter section 106 when the first down temperature zone is determined. Furthermore, the microcontroller 112 may be adapted to transmit a command to the inverter for controlling a parameter by a fourth factor in the inverter section 106 when the second down temperature zone is determined. Moreover, the microcontroller 112 may be adapted to transmit a command to the inverter for controlling a parameter by a fifth factor in the inverter section 106 when the alarm temperature zone is determined.

Thereby, by automatically controlling the parameter/s in the inverter section 106 by the first factor, the second factor, the third factor, the fourth factor, or the fifth factor, the inverter may accordingly control speed of the compressor. As used herein, the parameter/s to be controlled by the inverter may comprises, but is not limited to, a current parameter, a power parameter, a frequency parameter, a voltage parameter or any such parameter that is well known in the art. Moreover, the first factor, the second factor, the third factor, the fourth factor, or the fifth factor may be a particular value, a number, or a percentage by which the parameter/s may be controlled.

The term "controlling the parameter/s" or "controlling speed" as used herein may be defined as maintaining, increasing or decreasing the parameter or speed by a particular value, a number, or a percentage. This embodiment of the present invention provides the technical advantage of reducing the temperature within the inverter section 106 by controlling speed of the compressor, increasing the life of electronic components of the system 100 and avoiding failure and/or malfunctioning of the system 100.

When the microcontroller 112 determines the automatic temperature zone, the microcontroller 112 may command the inverter to automatically decide a first factor (i.e. any particular value, a number, or a percentage) by which the inverter may control the parameter/s inside the inverter section 106. In other words, the inverter may itself decide the first factor and control the parameter/s by the first factor to control speed of the compressor. When the microcontroller 112 determines the safe temperature zone, the microcontroller 112 may command the inverter to control the parameter in the same way in which the inverter is currently (or at that point of time) controlling the parameter/s by the second factor. In other words, the microcontroller 112 command the inverter to continue to control the parameter/s by the second factor for controlling speed of the compressor as the inverter was doing before. When the microcontroller 112 determines the first down temperature zone or the second down temperature zone, the microcontroller 112 may command the inverter to control the parameter/s by decreasing or reducing the parameter/s by the third factor or the fourth factor. When the microcontroller 112 determines the alarm temperature zone, the microcontroller 112 may command the inverter to control the parameter/s by the fifth factor for controlling the speed of the compressor. Also, the microcontroller 112 may provide an alarm to a facility (i.e. a control room) or a notification to a device. The alarm or the notification may indicate that the temperature inside the inverter section 106 has reached above the fifth pre-defined temperature value which requires immediate attention and needs to be controlled. An exemplary Table 1 is provided below illustrating the how parameter/s may be controlled by a factor/s to control the speed of the compressor. In Table 1, when the automatic temperature zone is determined, the current parameter may be maintained at approximately 21 amperes, the frequency parameter may be maintained at approximately 95 revolutions per second (RPS), and the voltage may be maintained at 400 AC Voltage. Similarly, when the safe temperature zone is determined, the current parameter may be maintained at approximately 21.5 amperes, the frequency parameter may be maintained at approximately 95 (RPS), and the voltage parameter may be maintained at 400 AC Voltage. Also, when the first down temperature zone is determined, the current parameter may be maintained at approximately 20.5 amperes, the frequency parameter may be maintained at approximately 90 (RPS), and the voltage parameter may be maintained at 400 AC Voltage. Likewise, when the second down temperature zone is determined, the current parameter may be maintained at approximately 19.9 amperes, the frequency parameter may be maintained at approximately 80 (RPS), and the voltage parameter may be maintained at 400 AC Voltage. Lastly, when the alarm temperature zone is determined, the current parameter may be stopped at 0 amperes, thereby making the frequency parameter may be maintained at approximately 0 (RPS). Based on the determined temperature zone, the microcontroller 112 may control an existing/recent value of parameter/s by a factor/s to maintain the parameter/s as specified in the Table 1.

TABLE 1

| Sensed Temperature | Determined Temperature Zone | Current Parameter | Frequency Parameter | Voltage Parameter | Speed of the Compressor |
|---|---|---|---|---|---|
| 54° Celsius | Automatic Temperature Zone | ~21.0 Amps | ~95 RPS | 400 AC Voltage | Automatically controlled |
| 55.6° Celsius | Safe Temperature Zone | ~21.5 Amps | ~95 RPS | 400 AC Voltage | Maintain same speed |
| 56.9° Celsius | First Down Temperature Zone | ~20.5 Amps | ~90 RPS | 400 AC Voltage | Reduce the speed |
| 58° Celsius | Second Down Temperature Zone | ~19.9 Amps | ~80 RPS | 400 AC Voltage | Reduce the speed |
| 65° Celsius | Alarm Temperature Zone | 0 Amps | 0 RPS | 400 AC Voltage | Stop the compressor & give alarm |

As can be seen in exemplary Table 1, when the current parameter decreases, the frequency parameter and the speed of the compressor also decreases. That is, the current parameter is directly proportional to the frequency parameter and the speed of the compressor. The values provided herein in Table 1 are exemplary and any changes/alterations in these values are within the scope of the present invention. Therefore, this embodiment of the invention provides technical advantage of continuous running of an air conditioner even when the outside ambient temperature is higher than the design condition of the air conditioner. The present invention also provides technical advantage of preventing failure of electrical component and providing an alarm indication if temperature of the inverter section goes beyond the specified pre-defined threshold.

Figure 3:
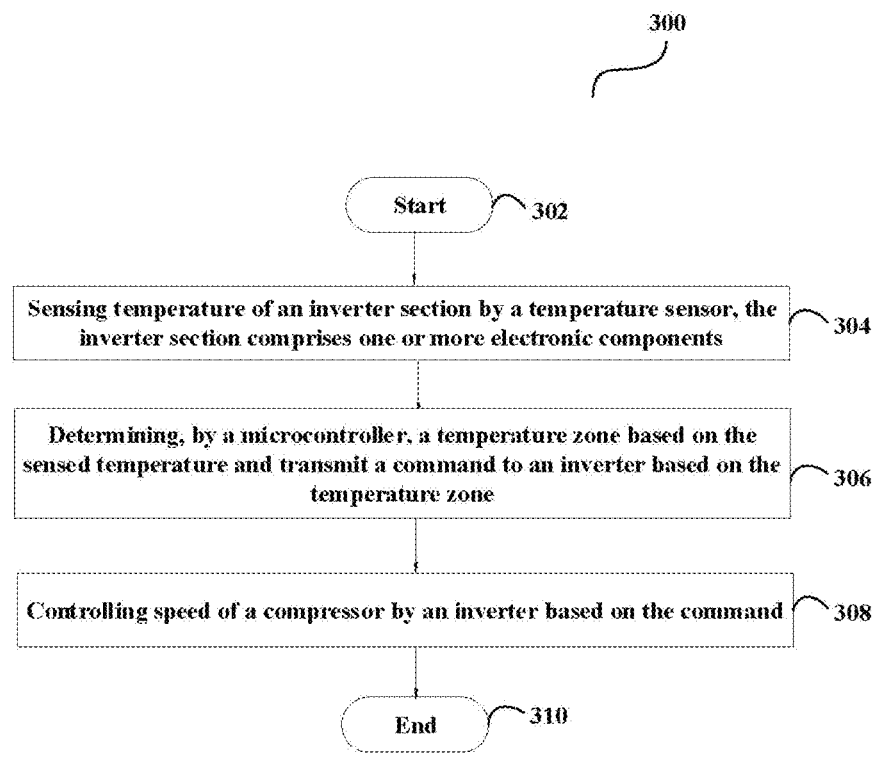
FIG. 3 is an exemplary flowchart illustrating a method to perform the invention in accordance with an exemplary embodiment of the invention.

FIG. 3 depicts a flowchart illustrating a method to perform the invention according to an exemplary embodiment of the invention. The method flowchart 300 describes a method being performed for enabling the invention. The method flowchart 300 may start at step 302.

At step 304, the system 100 may sense temperature of an inverter section 106 using a temperature sensor 116. The temperature sensor 116 may communicate the sensed temperature to a microcontroller 112.

At step 306, the system 100 may determine a temperature zone using the microcontroller 112 based on the sensed temperature as explained above. Also, the microcontroller 112 may transmit a command to an inverter based on the determined temperature zone.

At step 308, the system 100 may control speed of a compressor using the inverter. The speed of the compressor may be controlled based on the command as discussed above. The method flowchart 300 may end at step 310.

The present invention is applicable to any electrical/electronics systems known in the art that has an inverter section and that requires cooling of electronic components present within the electrical/electronics systems.

The embodiments of the invention and the table discussed herein are exemplary and various modification and alterations to a person skilled in the art are within the scope of the invention.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system comprising:
   a temperature sensor adapted to sense temperature of an inverter section, the inverter section comprises one or more electronic components;
   a microcontroller adapted to:
   determine a temperature zone based on the sensed temperature; and
   transmit a command to an inverter based on the temperature zone; and
   the inverter adapted to control speed of a compressor based on the command;
   wherein the microcontroller is adapted to determine an automatic temperature zone when the sensed temperature in the inverter section falls below or equal to a first pre-defined temperature value, wherein the microcontroller is adapted to transmit a command for automatically controlling a parameter by a first factor in the inverter section when the automatic temperature zone is determined;
   wherein the microcontroller is adapted to determine a safe temperature zone when the sensed temperature in the inverter section falls above a first pre-defined temperature value and falls below or equal to a second pre-defined temperature value, wherein the microcontroller is adapted to transmit a command for controlling a parameter by a second factor when the safe temperature zone is determined;
   wherein the microcontroller is adapted to determine a first down temperature zone when the sensed temperature in the inverter section falls above a second pre-defined temperature value and falls below or equal to a third pre-defined temperature value, wherein the microcontroller is adapted to transmit a command for controlling a parameter by a third factor when the first down temperature zone is determined, wherein the third factor reduces speed of the compressor to a non-zero speed in response to the determining the first down temperature zone.

2. The system of claim 1, wherein the temperature sensor is mounted inside the inverter section of the system.

3. The system of claim 1, wherein the microcontroller is adapted to determine the temperature zone by comparing the sensed temperature with one or more pre-defined temperature ranges.

4. The system of claim 1, wherein the microcontroller is adapted to determine a second down temperature zone when the sensed temperature in the inverter section falls above a third pre-defined temperature value and falls below or equal to a fourth pre-defined temperature value, wherein the microcontroller is adapted to transmit a command for controlling a parameter by a fourth factor when the second down temperature zone is determined.

5. The system of claim 1, wherein the microcontroller is adapted to determine an alarm temperature zone when the sensed temperature in the inverter section is above a fifth pre-defined temperature value, wherein the microcontroller is adapted to transmit a command for controlling a parameter by a fifth factor when the alarm temperature zone is determined.

6. The system of claim 5, wherein the microcontroller provides an alarm when the alarm temperature zone is determined.

7. The system of claim 1, wherein the system is an outdoor unit of an air conditioner system or a refrigeration system.

8. A method comprising:
   sensing temperature of an inverter section by a temperature sensor, the inverter section comprises one or more electronic components;
   determining, by a microcontroller, a temperature zone based on the sensed temperature and transmit a command to an inverter based on the temperature zone; and
   controlling speed of a compressor by an inverter based on the command;
   wherein the microcontroller is adapted to determine an automatic temperature zone when the sensed temperature in the inverter section falls below or equal to a first pre-defined temperature value, wherein the microcontroller is adapted to transmit a command for automatically controlling a parameter by a first factor in the inverter section when the automatic temperature zone is determined;
   wherein the microcontroller is adapted to determine a safe temperature zone when the sensed temperature in the inverter section falls above a first pre-defined temperature value and falls below or equal to a second pre-defined temperature value, wherein the microcontroller is adapted to transmit a command for controlling a parameter by a second factor when the safe temperature zone is determined;
   wherein the microcontroller is adapted to determine a first down temperature zone when the sensed temperature in the inverter section falls above a second pre-defined temperature value and falls below or equal to a third pre-defined temperature value, wherein the microcontroller is adapted to transmit a command for controlling a parameter by a third factor when the first down temperature zone is determined, wherein the third factor reduces speed of the compressor to a non-zero speed in response to the determining the first down temperature zone.

9. The method of claim 8, wherein the temperature sensor is mounted inside the inverter section of the system.

10. The method of claim 8, wherein the microcontroller is adapted to determine the temperature zone by comparing the sensed temperature with one or more pre-defined temperature ranges.

11. The method of claim 8, wherein the microcontroller is adapted to determine a second down temperature zone when the sensed temperature in the inverter section falls above a third pre-defined temperature value and falls below or equal to a fourth pre-defined temperature value, wherein the microcontroller is adapted to transmit a command for controlling a parameter by a fourth factor when the second down temperature zone is determined.

12. The method of claim 8, wherein the microcontroller is adapted to determine an alarm temperature zone when the sensed temperature in the inverter section is above a fifth pre-defined temperature value, wherein the microcontroller is adapted to transmit a command for controlling a parameter by a fifth factor when the alarm temperature zone is determined.

13. The method of claim 12, wherein the microcontroller provides an alarm when the alarm temperature zone is determined.

14. The method of claim 8, wherein the compressor is part of an outdoor unit of an air conditioner system or a refrigeration system.

15. A system comprising:
a temperature sensor adapted to sense temperature of an inverter section, the inverter section comprises one or more electronic components;
a microcontroller adapted to:
determine a temperature zone based on the sensed temperature; and
transmit a command to an inverter based on the temperature zone; and
the inverter adapted to control speed of a compressor based on the command;
wherein the microcontroller is adapted to determine an automatic temperature zone when the sensed temperature in the inverter section falls below or equal to a first pre-defined temperature value, wherein the microcontroller is adapted to transmit a command for automatically controlling a parameter by a first factor in the inverter section when the automatic temperature zone is determined;
wherein the microcontroller is adapted to determine a safe temperature zone when the sensed temperature in the inverter section falls above a first pre-defined temperature value and falls below or equal to a second pre-defined temperature value, wherein the microcontroller is adapted to transmit a command for controlling a parameter by a second factor when the safe temperature zone is determined;
wherein the microcontroller is adapted to determine a first down temperature zone when the sensed temperature in the inverter section falls above a second pre-defined temperature value and falls below or equal to a third pre-defined temperature value, wherein the microcontroller is adapted to transmit a command for controlling a parameter by a third factor when the first down temperature zone is determined, wherein the third factor reduces speed of the compressor to a first non-zero speed in response to the determining the first down temperature zone;
wherein the microcontroller is adapted to determine a second down temperature zone when the sensed temperature in the inverter section falls above a third pre-defined temperature value and falls below or equal to a fourth pre-defined temperature value, wherein the microcontroller is adapted to transmit a command for controlling a parameter by a fourth factor when the second down temperature zone is determined, wherein the fourth factor reduces speed of the compressor to a second non-zero speed in response to the determining the second down temperature zone, the second non-zero speed being less than the first non-zero speed;
wherein the microcontroller is adapted to determine an alarm temperature zone when the sensed temperature in the inverter section is above a fifth pre-defined temperature value, wherein the microcontroller is adapted to transmit a command for controlling a parameter by a fifth factor when the alarm temperature zone is determined, wherein the fifth factor stops the compressor.

* * * * *